(12) United States Patent
Baker et al.

(10) Patent No.: US 10,837,705 B2
(45) Date of Patent: Nov. 17, 2020

(54) CHANGE-OUT SYSTEM FOR SUBMERGED COMBUSTION MELTING BURNER

(71) Applicant: JOHNS MANVILLE, Denver, CO (US)

(72) Inventors: John Wayne Baker, Golden, CO (US); Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 443 days.

(21) Appl. No.: 14/855,483

(22) Filed: Sep. 16, 2015

(65) Prior Publication Data

US 2017/0074590 A1     Mar. 16, 2017

(51) Int. Cl.
F27D 99/00     (2010.01)
C03B 5/235     (2006.01)

(52) U.S. Cl.
CPC ............ *F27D 99/00* (2013.01); *C03B 5/2356* (2013.01)

(58) Field of Classification Search
CPC ........ F27D 99/00; C03B 5/2356; F23C 3/004; F23D 11/36
USPC .................................... 432/3, 135; 65/134.5
See application file for complete search history.

(56) References Cited

U.S. PATENT DOCUMENTS

| | | |
|---|---|---|
| 1,579,353 A | 4/1926 | Good |
| 1,636,151 A | 7/1927 | Schofield |
| 1,679,295 A | 7/1928 | Dodge |
| 1,706,857 A | 3/1929 | Mathe |
| 1,716,433 A | 6/1929 | Ellis |
| 1,675,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Sayler |
| 2,658,094 A | 11/1953 | Nonken |
| 2,677,003 A | 4/1954 | Arbeit et al. |

(Continued)

FOREIGN PATENT DOCUMENTS

| | | |
|---|---|---|
| DE | 36 29 965 A1 | 3/1988 |
| DE | 40 00 358 | 3/1993 |
| DE | 44 24 814 A1 | 1/1996 |
| DE | 196 19 919 A1 | 8/1997 |

(Continued)

OTHER PUBLICATIONS

"AccuTru Temperature Measurement," AccuTru International Corporation, 2003.

(Continued)

*Primary Examiner* — Steven B McAllister
*Assistant Examiner* — Benjamin W Johnson
(74) *Attorney, Agent, or Firm* — Robert D. Touslee

(57) ABSTRACT

Liquid is delivered into a void between a burner and a melt vessel, which causes a skull of a material to form within an interior of the melt vessel. The void is in fluidic communication with the interior of the melt vessel. The burner is moved from a first position internal to the void to a second position external from the void. Thereafter, the burner is isolated from the void.

8 Claims, 9 Drawing Sheets

(56) References Cited

U.S. PATENT DOCUMENTS

| | | |
|---|---|---|
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,690,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgrnan et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plurnat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,692,017 A | 9/1972 | Glachant et al. |
| 3,717,139 A | 2/1973 | Guillet et al. |
| 3,738,792 A * | 6/1973 | Feng ............... F23D 17/00 431/158 |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,565 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmulier |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest, Jr. |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,599,100 A | 7/1986 | Demarest |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Dernarest, Jr. et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen |
| 4,738,938 A | 4/1988 | Kunkle et al. |
| 4,758,259 A | 7/1988 | Jensen |
| 4,781,576 A * | 11/1988 | Dewitz ............... C10J 3/506 110/322 |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,866 A | 5/1990 | Backderf et al. |
| 4,932,035 A | 6/1990 | Pieper |
| 4,953,376 A | 9/1990 | Merlone |
| 4,963,731 A | 10/1990 | King |

(56) References Cited

U.S. PATENT DOCUMENTS

| | | |
|---|---|---|
| 4,969,942 A | 11/1990 | Schwenninger et al. |
| 4,973,346 A | 11/1990 | Kobayashi et al. |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Watzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novick |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |

(56) References Cited

U.S. PATENT DOCUMENTS

| | | |
|---|---|---|
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1* | 11/2002 | Jeanvoine ............... C03B 5/225 65/134.5 |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1* | 10/2005 | Rue ............... C03B 5/2356 266/217 |
| 2006/0000239 A1 | 1/2006 | Jeanvoine et al. |
| 2006/0101859 A1 | 5/2006 | Tagaki et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0173067 A1* | 7/2010 | Ukigaya ............... C23C 14/12 427/66 |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |

FOREIGN PATENT DOCUMENTS

| | | |
|---|---|---|
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 3/2012 |
| EP | 2 578 548 A2 | 4/2013 |
| FR | 2 740 860 A1 | 9/1997 |
| GB | 191301772 | 1/1914 |
| GB | 191407633 | 3/1914 |
| GB | 164073 A | 5/1921 |
| GB | 1449439 | 9/1976 |
| IT | 1208172 | 7/1989 |
| JP | S53 199728 A | 11/1983 |
| KR | 2000 0050572 A | 8/2000 |
| KR | 100465272 | 12/2004 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |

OTHER PUBLICATIONS

"Glass Technologies—The Legacy of a Successful Public-Private Partnership", 2007, U.S. Department of Energy, pp. 1-32.

(56) References Cited

OTHER PUBLICATIONS

"Glass Melting Technology—A Technical and Economic Assessment," 2004, U.S. Department of Energy, pp. 1-292.
Muijsenberg, H, P. H., Neff, G., Muller, J., Chmelar, J., Bodi, R, and Matustikj, F. (2008) "An Advanced Control System to Increase Glass Quality and Glass Production Yields Based on GS ESLLI Technology", in A Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting— The Next Generation Metter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, copy received in Apr. 2012 at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-63, 1992.
Kim et al., "Effect of Furnace Atmosphere on E-glass Foaming", Journal of Non-Crystalline Solids, 352(50/51), pp. 5287-95, 2006.
Van Limpt et al., "Modelling the evaporation of boron species. Part 1. Alkali-free borosilicate glass melts", Glass Technology—European Journal of Glass Science and Technology, Part. A, 52(3): pp, 77-87, 2011.
Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.
"Gamma Irradiators for Radiation Precessing" Boeklet, International Atomic Energy Agency, Vienna, Austria.
Furman, BJ, ME 120 Experimental Methods Vibration Measurement, San Jose University Department of Mechanical and Aerospace Engineering.
Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Gerber, J., "Les Densimetres Industriels," Petrole et Techniques, Association Francaise des Techniciens du Petrole, Jun. 1, 1989, pp. 26-27, No. 349, Paris, France.
Rue et al, "Submerged Combustion Melting of Glass," International Journal of Applied Glass Science, Nov. 9, 2011, pp. 262-274, vol. 2, No. 4.
National Laboratory, US DOE contract No. DE-AC09-08SR22470, Oct. 2011.

* cited by examiner

CHANGE-OUT SYSTEM FOR SUBMERGED COMBUSTION MELTING BURNER

BACKGROUND

In submerged combustion melting (SCM), combustion gases are injected beneath a surface of a molten matrix and rise upward through the melt. The matrix can include glass and/or inorganic non-metallic feedstocks such as rock (basalt) and mineral wool (stone wool). Regardless of the material utilized, it is heated at a high efficiency via the intimate contact with the combustion gases and melts into a matrix. Using submerged combustion burners produces violent turbulence of the molten matrix and results in a high degree of mechanical energy in the submerged combustion melter. The submerged combustion burners have to be replaced as part of normal maintenance. Prior approaches to burner replacement require shutdown of the entire melting system, which includes removing all of the molten matrix and cooling the various components to an appropriate, lower temperature, before removing the burner(s) for service and/or replacement. This process results in a considerable amount of system downtime.

SUMMARY

In one aspect, the technology relates to a method including: delivering a liquid into a void between a burner and a melt vessel so as to form a skull of a material disposed within an interior of the melt vessel, wherein the void is in fluidic communication with the interior of the melt vessel; moving the burner from a first position internal to the void to a second position external from the void; and once the burner is in the second position, isolating the burner from the void. In an example, the method includes fixing a position of a cooling vessel relative to the melt vessel, wherein the cooling vessel is fixed in the position so as to at least partially surround the burner when the burner is in the first position. In another example, when the burner is in the second position, the burner is disposed distal from the melt vessel. In yet another example, the burner occupies a first volume of the cooling vessel when the burner is in the first position and wherein the burner occupies a second volume of the cooling vessel when the burner is in the second position, wherein the second volume is greater than the first volume. In still another example, the method includes unfixing the position of the cooling vessel relative to the melt vessel, once the burner is in the second position.

In another example of the above aspect, the isolating operation includes closing a valve disposed between the burner and the void when the burner is in the second position. In an example, the method includes interrupting a fuel flow to the burner, prior to moving the burner to the second position. In another example, the void defines an annular volume between the burner and the melt vessel when the burner is in the first position. In yet another example, the melt vessel is utilized in an SCM melter system.

In another aspect, the technology relates to a system including: a cooling vessel having a housing defining an interior cooling volume and a burner port defined by at least one wall of the housing; a collar defining an interior collar volume wherein, the collar is disposed proximate the burner port, wherein a first end of the collar is substantially aligned with the burner port; and a valve disposed at a second end of the collar, the valve having a body defining an opening substantially aligned with the second end of the collar, wherein the valve is configured to isolate the interior collar volume and the interior cooling volume from an exterior of the cooling vessel. In an example, a support element is movable relative to the cooling vessel. In another example, the support element is disposed within the cooling vessel, wherein the support element is configured to at least partially support a burner. In yet another example, an actuator is configured to move the support element from a first position to a second position. In still another example, a flange is releasably engageable with the body of the valve, wherein the flange includes a first fluid port and a second fluid port configured to move fluid into and out of an interior of the flange, wherein the interior of the flange is substantially aligned with the valve.

In another example of the above aspect, the flange is configured to be secured to a melt vessel. In an example, the collar includes a plurality of plates, wherein at least one of the plurality of plates is configured to be releasably secured to the cooling vessel. In another example, wherein the cooling vessel defines at least one hose opening for sealably receiving at least one hose configured to be connected to a burner disposed in the cooling vessel.

In another aspect, the technology relates to a method including: emitting heat energy from a first burner of an SCM melter so as to melt a material disposed in the SCM melter; emitting heat energy from a second burner of the SCM melter so as to melt the material disposed in the SCM melter; terminating emission of heat energy from the first burner; maintaining heat energy emission from the second burner; injecting fluid into the SCM melter proximate the first burner so as to form a skull of material proximate the first burner; and removing the first burner from the SCM melter while the second burner emits heat energy. In an example, the method includes lowering the first burner into a cooling vessel during removal of the first burner. In another example, the method includes inserting a third burner in a position formerly occupied by the first burner.

In another aspect, the technology relates to a system including: a melt vessel; a flange secured to the melt vessel; a burner movably disposed within the flange, the burner including a tip; and a valve secured to the flange opposite the melt vessel, wherein the valve is configured to be open when the tip is disposed on a first side of the valve, and wherein the valve is configured to be closed when the tip is disposed on a second side of the valve. In an example, a cooling vessel having a housing defining an interior cooling volume and a burner port defined by at least one wall of the housing; and a collar defining an interior collar volume, wherein the collar is disposed proximate the burner port, wherein a first end of the collar is substantially aligned with the burner port, and wherein the collar is connected to the valve. In another example, the flange further includes a fluid inlet port and a fluid outlet port, wherein the fluid inlet port and the fluid outlet port are configured to circulate fluid within a void defined by the flange. In yet another example, a support element is movably disposed in the cooling vessel, wherein the support element is configured to support the burner when the burner is on both the first side of the valve and the second side of the valve. In still another example, the collar includes a plurality of plates, wherein at least one of the plurality of plates is configured to be releasably secured to the cooling vessel. In yet another example, the tip is disposed on the first side of the valve, the tip is proximate the melt vessel, and wherein when the tip is disposed on the second side of the valve, the tip is distal from the melt vessel.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

In the following description, numerous details are set forth to provide an understanding of various melter apparatus and process examples in accordance with the present disclosure. However, it will be understood by those skilled in the art that the melter apparatus and processes of using same may be practiced without these details and that numerous variations or modifications from the described examples may be possible which are nevertheless considered within the appended claims. All published patent applications and patents referenced herein are hereby incorporated by reference herein in their entireties.

Figure 1:
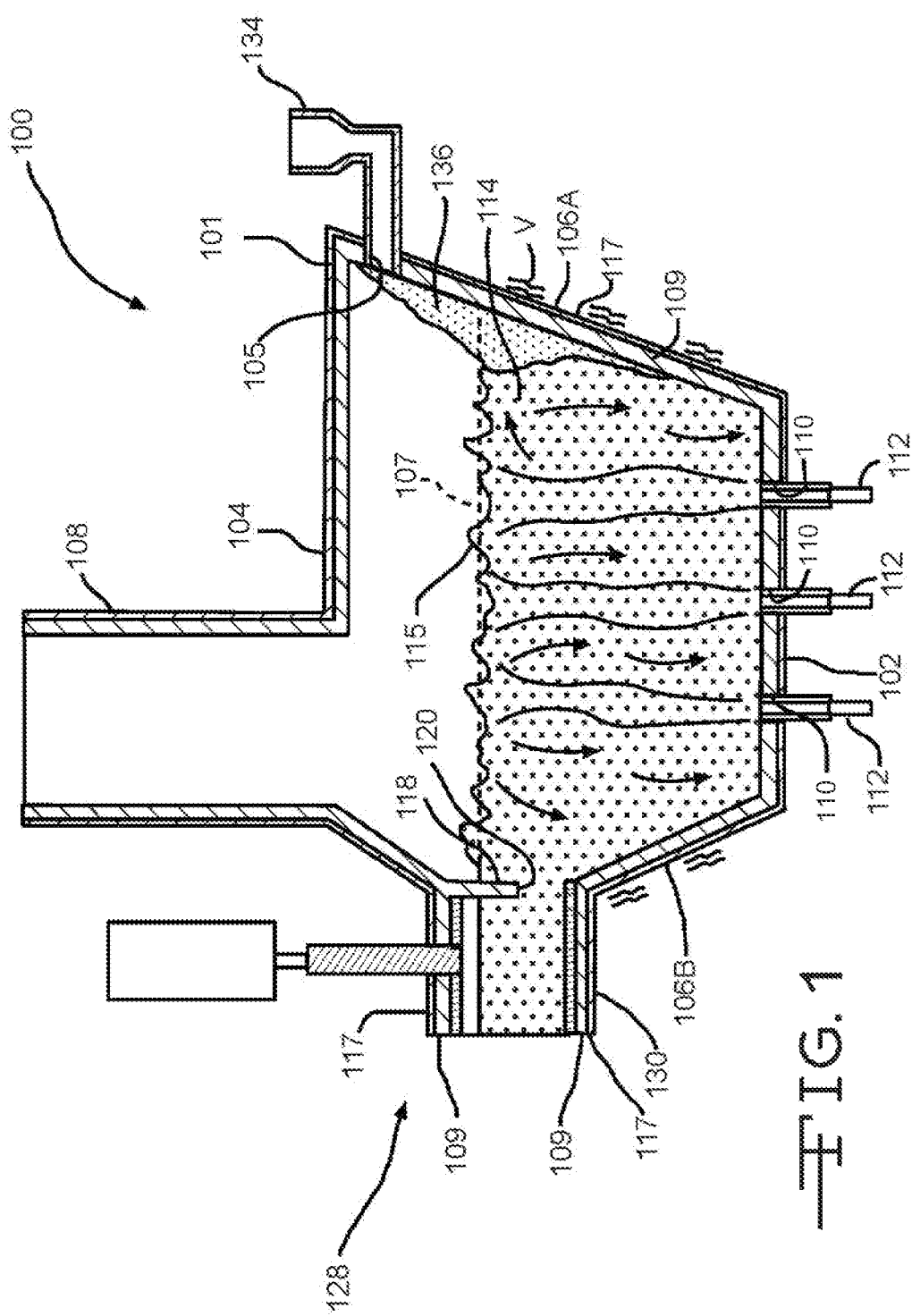
FIG. 1 depicts a side sectional view of a melter that may be utilized in conjunction with the examples of the technology described herein.

FIG. 1 depicts a side sectional view of a melter system 100 that may be utilized in conjunction with the examples of the technology described herein. The melter system 100 is a submerged combustion melter (SCM) and is described in more detail in U.S. Patent Application Publication No. 2013/0283861, the disclosure of which is hereby incorporated by reference herein in its entirety. Melter apparatus or melt vessel 101 of FIG. 1 includes a floor 102, a roof or ceiling 104, a feed end wall 106A, a first portion of an exit end wall 106B, and a second portion of the exit end wall 106C. Each of the floor 102, the roof 104, and walls 106A, 106B, and 106C comprise a metal shell 117 and a refractory panel 109, some or all of which may be fluid-cooled. Exit end wall portion 106C may form an angle with respect to a skimmer 118.

The melt vessel 101 may be fluid cooled by using a gaseous, liquid, or combination thereof, heat transfer media. In certain examples, the wall may have a refractory liner at least between the panels and the molten glass. Certain systems may cool various components by directing a heat transfer fluid through those components. In certain examples, the refractory cooled-panels of the walls, the fluid-cooled skimmer, the fluid-cooled dam, the walls of the fluid-cooled transition channel, and the burners may be cooled by a heat transfer fluid selected from the group consisting of gaseous, liquid, or combinations of gaseous and liquid compositions that function or are capable of being modified to function as a heat transfer fluid. Different cooling fluids may be used in the various components, or separate portions of the same cooling composition may be employed in all components. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids, which may be organic, inorganic, or some combination thereof, for example, salt solutions, glycol solutions, oils and the like. Other possible heat transfer fluids include water, steam (if cooler than the oxygen manifold temperature), carbon dioxide, or mixtures thereof with nitrogen. Heat transfer fluids may be compositions including both gas and liquid phases, such as the higher chlorofluorocarbons.

The melt vessel 101 further includes an exhaust stack 108, and openings 110 for submerged combustion burners 112, which create during operation a highly turbulent melt matrix indicated at 114. Highly turbulent melt matrix 114 may have an uneven top surface 115 due to the nature of submerged combustion. An average level 107 is illustrated with a dashed line. In certain examples, burners 112 are positioned to emit combustion products into molten matrix in the melting zone 114 in a fashion so that the gases penetrate the melt generally perpendicularly to floor 102. In other examples, one or more burners 112 may emit combustion products into the melt at an angle to floor 102.

In an SCM, combustion gases emanate from burners 112 under the level of a molten matrix. The burners 112 may be floor-mounted, wall-mounted, or in melter examples comprising more than one submerged combustion burner, any combination thereof (for example, two floor mounted burners and one wall mounted burner). These combustion gases may be substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels.

A burner 112 may be an air-fuel burner that combusts one or more fuels with only air, or an oxy-fuel burner that combusts one or more fuels with either oxygen alone, or employs oxygen-enriched air, or some other combination of air and oxygen, including combustion burners where the primary oxidant is air, and secondary and tertiary oxidants are oxygen. Burners may be comprised of metal, ceramic, ceramic-lined metal, or combination thereof. Air in an air-fuel mixture may include ambient air as well as gases having the same molar concentration of oxygen as air. Oxygen-enriched air having an oxygen concentration greater than 121 mole percent may be used. Oxygen may include pure oxygen, such as industrial grade oxygen, food grade oxygen, and cryogenic oxygen. Oxygen-enriched air may have 50 mole percent or more oxygen, and in certain examples may be 90 mole percent or more oxygen. Oxidants such as air, oxygen-enriched air, and pure oxygen may be supplied from a pipeline, cylinders, storage facility, cryogenic air separation unit, membrane permeation separator, or adsorption unit.

The fuel burned by the burners may be a combustible composition (either in gaseous, liquid, or solid form, or any flowable combination of these) having a major portion of, for example, methane, natural gas, liquefied natural gas, propane, atomized oil, powders or the like. Contemplated fuels may include minor amounts of non-fuels therein, including oxidants, for purposes such as premixing the fuel with the oxidant, or atomizing liquid fuels.

At least some of the burners may be mounted below the melt vessel, and in certain examples the burners may be positioned in one or more parallel rows substantially perpendicular to a longitudinal axis of the melt vessel. In certain examples, the number of burners in each row may be proportional to width of the vessel. In certain examples the depth of the vessel may decrease as width of the vessel decreases. In certain other examples, an intermediate location may comprise a constant width zone positioned between an expanding zone and a narrowing zone of the vessel, in accordance with U.S. Patent Application Publication No. 2011/0308280, the disclosure of which is hereby incorporated by reference herein in its entirety.

Returning to FIG. 1, the initial raw material can be introduced into melt vessel 101 on a batch, semi-continuous or continuous basis. In some examples, a port 105 is arranged at end 106A of melt vessel 101 through which the initial raw material is introduced by a feeder 134. In some examples, a batch blanket 136 may form along wall 106A, as illustrated. Feed port 105 may be positioned above the average matrix melt level, indicated by dashed line 107. The amount of the initial raw material introduced into melt vessel 101 is generally a function of, for example, the capacity and operating conditions of melt vessel 101 as well as the rate at which the molten material is removed from melt vessel 101.

The initial raw material may include any material suitable for forming a molten matrix, such as glass and/or inorganic non-metallic feedstocks such as rock (basalt) and mineral wool (stone wool). With regard to glass matrices, specifically, limestone, glass, sand, soda ash, feldspar and mixtures thereof can be utilized. In one example, a glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in U.S. Published Patent Application No. 2008/0276652, the disclosure of which is hereby incorporated by reference herein in its entirety. The initial raw material can be provided in any form such as, for example, relatively small particles.

As noted herein, submerged combustion burners may produce violent turbulence of the molten matrix and may result in a high degree of mechanical energy (e.g., vibration V in FIG. 1) in the submerged combustion melter that, without modification, is undesirably transferred to the conditioning channel. Vibration may be due to one or more impacts from sloshing of the molten matrix, pulsing of the submerged combustion burners, popping of large bubbles above submerged burners, ejection of the molten matrix from main matrix melt against the walls and ceiling of melt vessel 101, and the like. Melter exit structure 128 comprises a fluid-cooled transition channel 30, having generally rectangular cross-section in melt vessel 101, although any other cross-section would suffice, such as hexagonal, trapezoidal, oval, circular, and the like. Regardless of cross-sectional shape, fluid-cooled transition channel 130 is configured to form a frozen matrix layer or highly viscous matrix layer, or combination thereof, on inner surfaces of fluid-cooled transition channel 130 and thus protect melter exit structure 128 from the mechanical energy imparted from the melt vessel 101 to melter exit structure 128.

Figure 2:
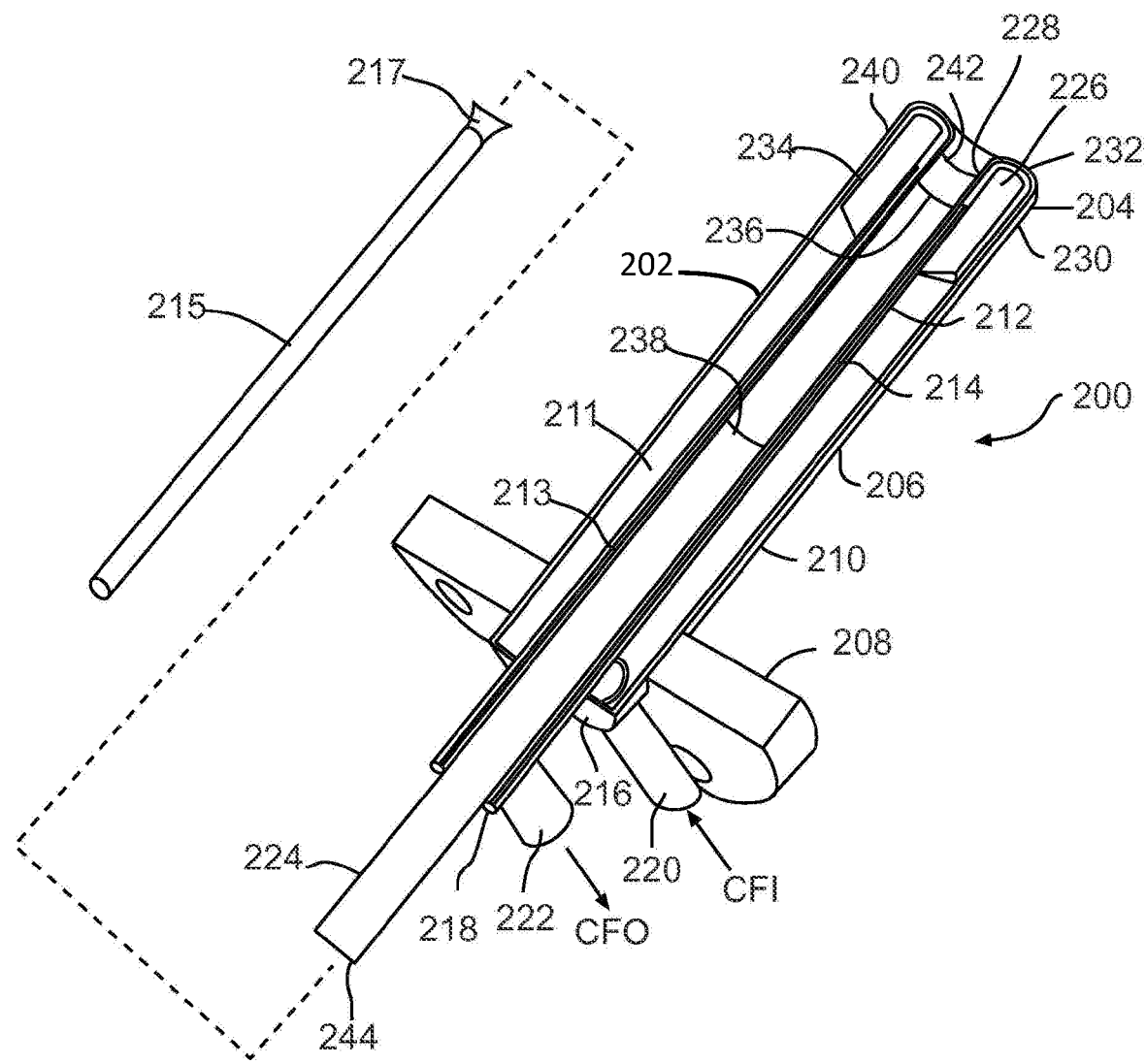
FIG. 2 depicts a side sectional view of a burner that may be utilized in conjunction with the examples of the technology described herein.

FIG. 2 depicts a side sectional view of a burner 200 that may be utilized in conjunction with the examples of the technology described herein. The burner 200 is an SCM burner having a fluid-cooled portion 202 having a burner tip 204 attached to a burner body 206. A burner main flange 208 connects the burner to an SCM superstructure or flange, illustrated below. Burner body 206 has an external conduit 210, a first internal conduit 212, a second internal conduit 214, and end plates 216, 218. A coolant fluid inlet conduit 220 is provided, along with a coolant fluid exit conduit 222, allowing ingress of a cool coolant fluid as indicated by an arrow CFI, and warmed coolant fluid egress, as indicated by an arrow CFO, respectively. A first annulus 211 is thus formed between substantially concentric external conduit 210 and first internal conduit 212, and a second annulus 213 is formed between substantially concentric first and second internal conduits 212, 214. A proximal end 224 of second internal conduit 214 may be sized to allow insertion of a fuel or oxidant conduit 215 (depending on the burner arrangement), which may or may not include a distal end nozzle 217. When conduit 215 and optional nozzle 217 are inserted internal of second internal conduit 214, a third annulus is formed there between. In certain examples, oxidant flows through the third annulus, while one or more fuels flow through conduit 215, entering through a port 244. In certain other examples, one or more fuels flow through the third annulus, while oxidant flows through conduit 215, entering through port 244.

The fluid-cooled portion 202 of the burner 200 includes a ceramic or other material insert 226 fitted to the distal end of first internal conduit 212. Insert 226 has a shape similar to but smaller than burner tip 204, allowing coolant fluid to pass between burner tip 204 and insert 226, thus cooling burner tip 204. Burner tip 204 includes an inner wall 228, an outer wall 230, and a crown 232 connecting inner wall 228 and outer wall 230. In prior art burners, welds at locations 234 and 236, and optionally at 238, 240 and 242, connect burner tip 204 to external conduit 210 and second internal conduit 214, using conventional weld materials to weld together similar base metal parts, such as carbon steel, stainless steel, or titanium. Despite the use of coolant and even titanium (which ordinarily is considered quite corrosion-resistant), the operating life of burners as illustrated and described in relation to FIG. 2 are very limited in the SCM environment, where temperatures of the molten matrix may reach 1300° C., and the turbulence of the molten matrix caused by the burners themselves as well as combustion gases contribute to form a highly erosive environment in contact with the burner tip. As such, the burners used in SCM applications have to be replaced often. Other examples of SCM burners that can be used in conjunction with the technologies described herein are described in PCT Application Publication No. 2014/189501, the disclosure of which is hereby incorporated by reference herein in its entirety. SCM melters that utilize so-called dry tip burners can also benefit from the technologies described herein. Application of the technologies described herein to such dry tip burners will be apparent to a person of skill in the art. For clarity, however, the replacement or change-out technologies described in the present application will be described in the context of water-cooled SCM burners.

Figure 3:
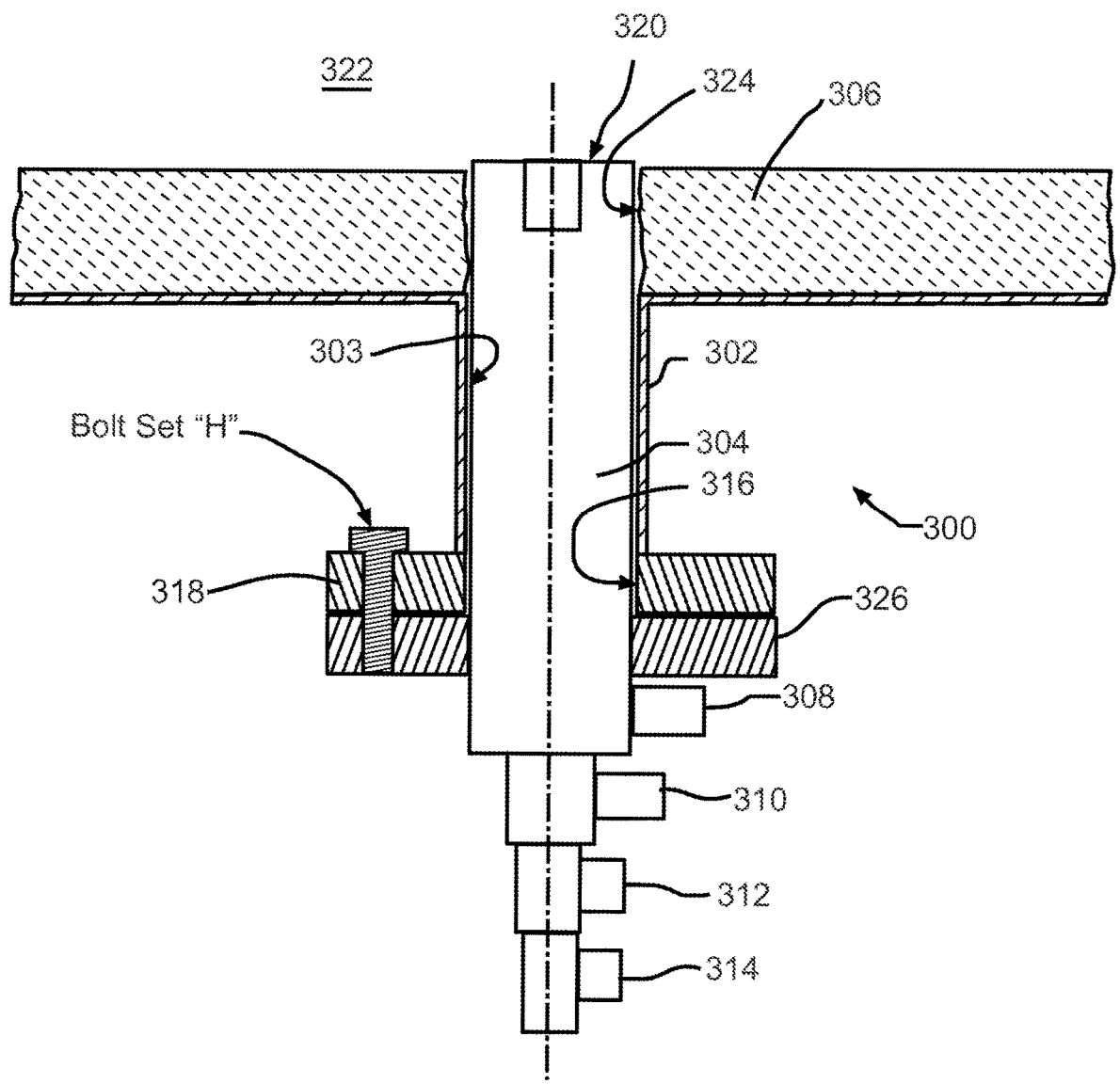
FIG. 3 depicts a side sectional view of a prior art burner mount.

FIG. 3 depicts a side sectional view of a prior art burner mount 300. The mount 300 includes a flange 302 that supports a burner 304, such as described in FIG. 2, in an interior void 303 thereof. The flange 302 is secured to an underside of a melt vessel or refractory 306, such as described in conjunction with the melter system of FIG. 1. Typically, the burner 304 is inserted into the mount 300 when the melt vessel 306 is empty and the melter system is out of service. The burner 304 includes a number of connections, for example an oxidizer connection 308 and a fuel connection 310. Burners 304 that utilize liquid cooling also include a cooling fluid supply connection 312 and a cooling liquid return connection 314. In examples, the cooling fluid can be water or other liquid coolants. The burner 304 penetrates a holder opening 316 in a burner holder 318 that fixes a position of the burner 304 within the flange 302, such that a burner tip 320 penetrates into or proximate an interior volume 322 of the vessel 306 at a vessel opening 324. A main flange or ring 326 secured to the burner 304 provides a point of connection with the burner holder 318. One or more bolts (typically a plurality are utilized) can be used to secure the position of the burner 304 in the flange 302. These bolts are depicted as bolt set H. As can be seen, if the burner 304 requires replacement or repair, it cannot be removed with the melter system in service, as there would be no mechanism to close either the vessel opening 324 or the holder opening 316. If removed, the molten matrix would drain through the openings 324, 316, thereby causing an unsafe condition and loss of matrix.

The technologies described herein include components to enable swapping- or changing-out a submerged combustion burner without the need to shut down the melter system, drain and cool the vessel, remove and replace the burner, reheat the vessel, and restart melting operations. The ability to remove and replace the burner while keeping the melter system in operation extends the life of components utilized therein and significantly reduces lost production time. The following description and figures depict exemplary change-out systems in more detail.

Figure 4:
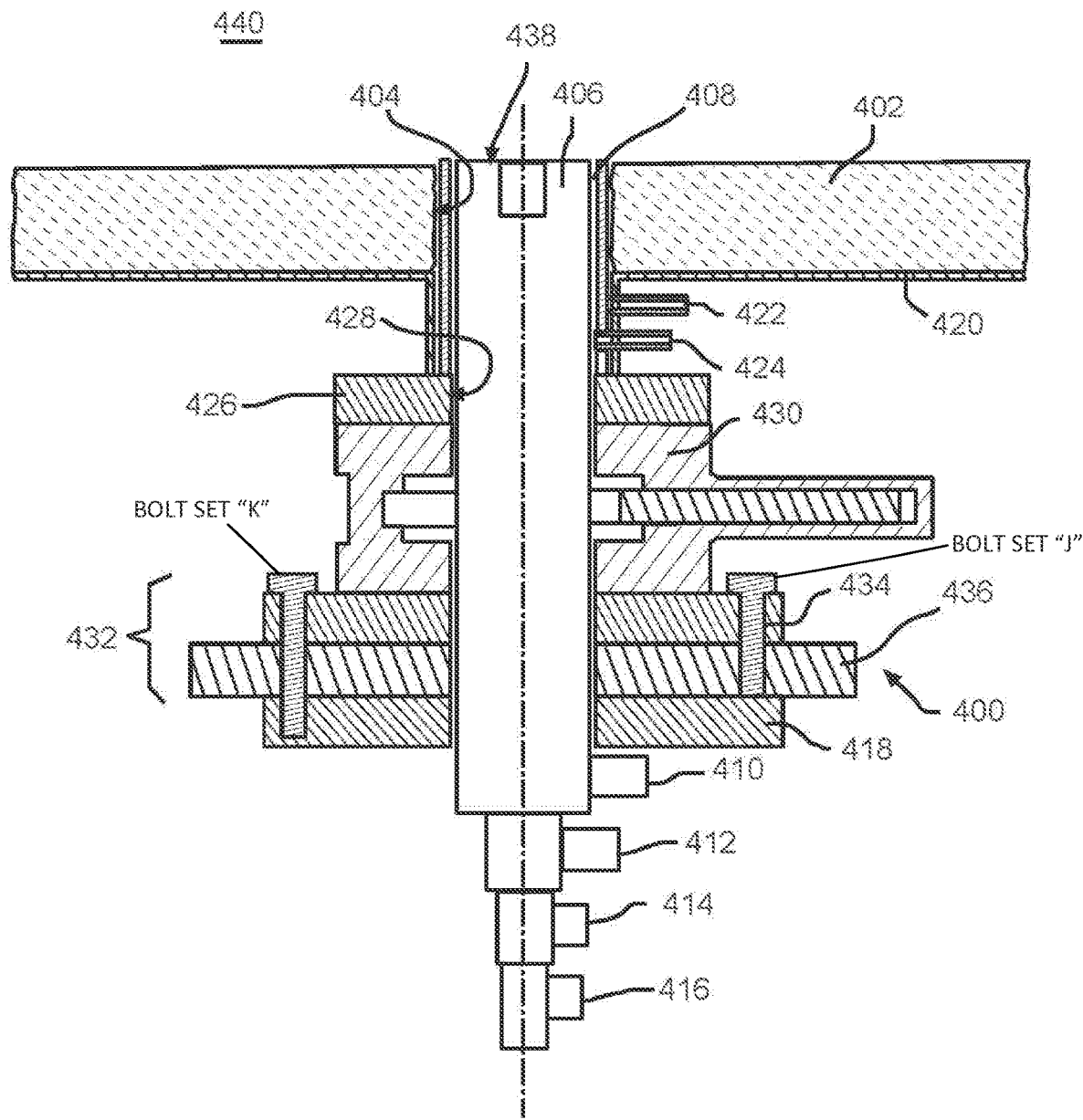
FIG. 4 depicts a partial side sectional view of a burner change-out system in accordance with an example of the present technology.

FIG. 4 depicts a partial side sectional view of a burner change-out system 400 in accordance with an example of the present technology. The system 400 includes a number of components. As with the mount 300 depicted in FIG. 3, the change-out system 400 is utilized in conjunction with an SCM melt vessel or refractory 402 that defines a vessel opening 404 for receipt of a burner 406. When the burner 406 is disposed in the vessel opening 404, an annular void 408 is formed therebetween. As above, the burner 406 includes a number of connections, for example an oxidizer connection 410 and a fuel connection 412. Burners 406 that also utilize liquid cooling include a cooling fluid supply connection 414 and a cooling liquid return connection 416, although the technologies described herein are not limited to liquid-cooled burners. A burner main flange or ring 418 is connected to the burner 406 to support the burner 406 as described herein. The change-out system 400 includes a flange 420 that is configured to be secured to an underside of the vessel 402. The flange 420 includes two fluid ports 422, 424 that are used to circulate a cooling liquid, such as the types described above, into the void 408 during burner change-out operations. In the depicted example, fluid inlet port 422 and fluid outlet port 424 are normally closed during melt operations. A burner holder 426 forms a bottom of the flange 420 and defines a holder opening 428 for receiving the burner 406.

An upper side of a valve 430 is disposed proximate the flange 420. In FIG. 4, the valve 430 is a gate valve, although other valve types can be utilized. A bottom side of the valve 430 is disposed proximate a collar 432 that includes a valve plate 434 and a change-out adapter 436. The collar 432 connects the various elements of the change-out system 400 as described further herein. During operation of the melter system, the gate valve 430 is normally open, as depicted, due to the presence of the burner 406. The burner 406 is depicted in a first position, such that a tip 438 thereof is disposed proximate an interior 440 of the vessel 402. One or more bolts (e.g., bolt set J) secure the valve plate 434 to the change-out adapter 436. Additionally, one or more bolts (e.g., bolt set K) secure the valve plate 434 to the burner ring 418. Both bolt sets J and K are engaged during normal melt system operations. Each of the flange 420, burner holder 426, valve 430, and collar 432 define an interior void or volume. These voids or volumes are substantially aligned so as to accommodate the burner 406 throughout the removal and insertion processes described below.

Figure 5:
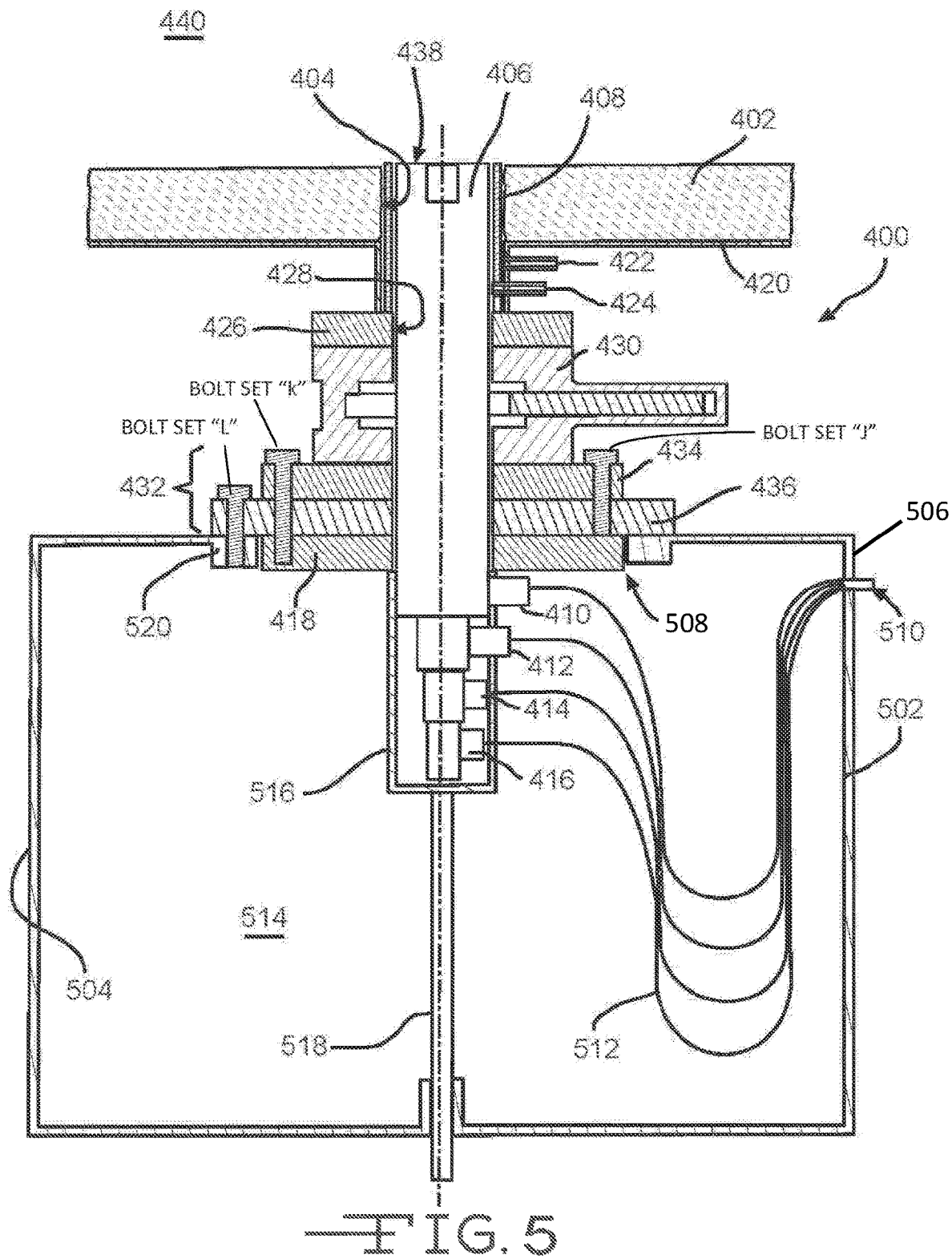
FIG. 5 depicts a side sectional view of a burner change-out system, having a burner in a first position.

FIG. 5 depicts a side sectional view of a burner change-out system 400, having the burner 406 in a first position. A number of components of the system 400 are described above with regard to FIG. 4 and as such are not necessarily described further. The change-out system 400 includes a cooling box or vessel 502 that is used to remove and cool the burner 406 after removal from the melt vessel 402. The cooling vessel 502 includes a housing 504 having a plurality of walls 506, one of which (in this case, an upper wall) defines a burner port 508. In the depicted example, the burner port 508 is sized to receive the burner ring 418. The cooling vessel 502 can also define one or more hose openings 510 that allow passage of one or more hoses 512 that serve the various connections 410-416. As the cooling vessel interior 514 is filled with cooling water or other coolant, the hose opening(s) 508 are sealed. Additional hose openings can be utilized to circulate cooling fluid within the cooling vessel 502 during change-out operations. A support element 516 is movable within the cooling vessel interior 514 via an actuator or lift assembly 518. Prior to removal of the burner 406, the change-out adapter 436 is connected to a rim 520 about the burner port 508 with bolt set L.

FIG. 5 depicts the burner 406 in a first, or upper position, where the burner 406 is positioned so as to deliver energy in the form of heat to the melt matrix disposed in the vessel 402. To remove the burner 406 from service in the SCM melter, the cooling vessel 502 is first connected to the collar 432 (e.g., via the bolt set L). The cooling vessel 502 is filled with water or other coolant and/or the water/coolant may be circulated therethrough. Once the cooling vessel 502 is fixed relative to the burner 406, at least a portion of the burner 406 is disposed within or supported by the support element 516. Fuel flow to the burner 406 is terminated or interrupted and heat energy emitted by the burner 406 begins to dissipate. Around the time fuel flow is terminated, water or other coolant liquid is introduced, injected, or otherwise pumped through the fluid inlet port 422 into the annular void 408 between the burner 406 and the vessel opening 404. By cooling the temperature in the void 408 (due to termination of fuel flow and initiation of cooling fluid flow), a skull or hardened shell is formed over the burner 406. This skull is essentially a non-molten portion of the matrix within the vessel 402 and prevents molten matrix from contacting the burner 406. Cooling fluid can be circulated via the fluid outlet port 424 to maintain the temperature in the void 408 at a level so as to maintain the integrity of the skull.

Figure 6:
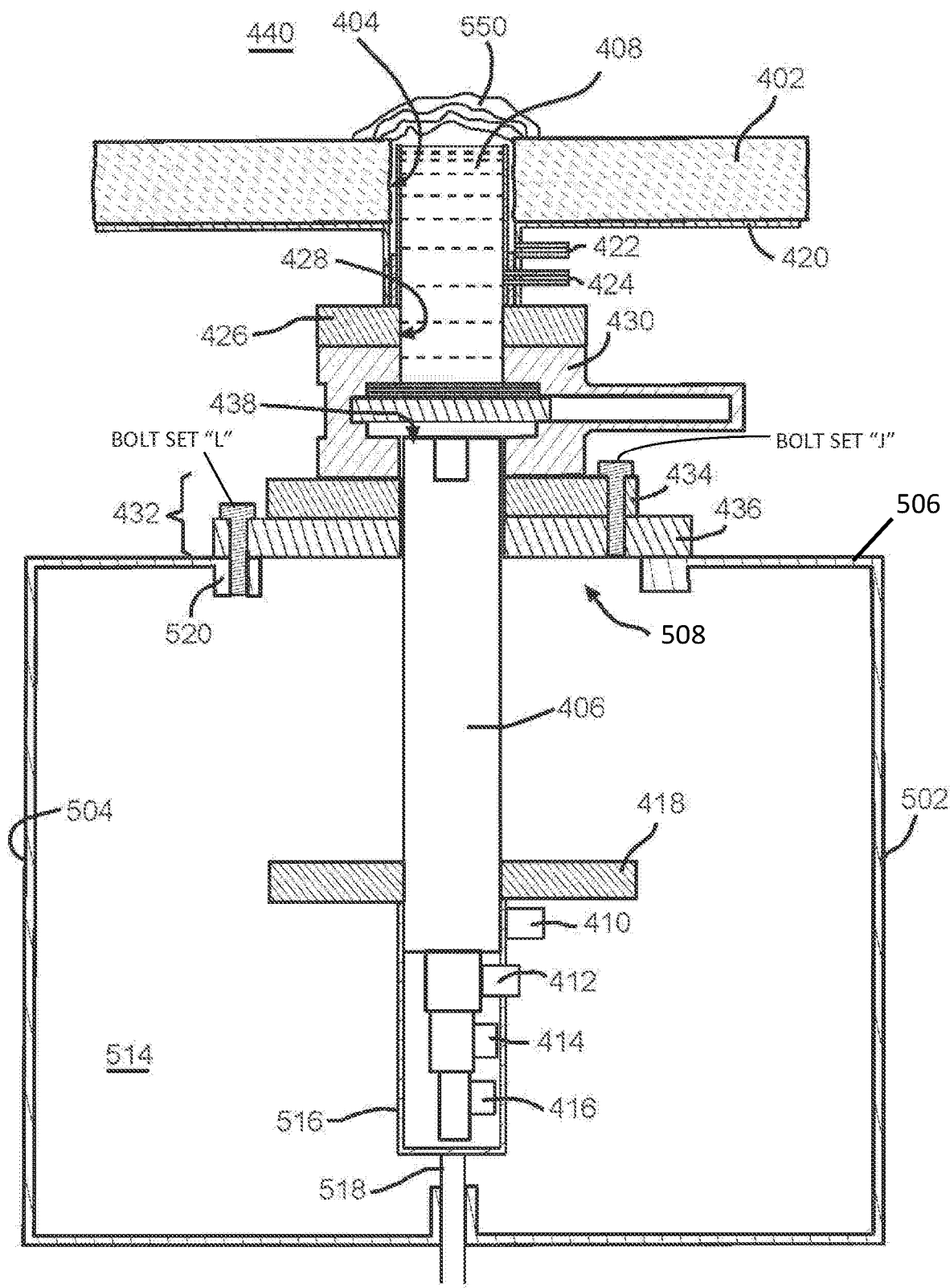
FIG. 6 depicts a side sectional view of the burner change-out system of FIG. 5, having the burner in a second position.

FIG. 6 depicts a side sectional view of the burner change-out system 400 of FIG. 5, having the burner 406 in a second position. A number of components of the system 400 are described above with regard to FIGS. 4 and 5 and as such are not necessarily described further. The hoses depicted in FIG. 5 are not depicted for clarity. Here, the burner 406 is depicted in a lower, or second position, where the burner 406 is disposed distal from the melt vessel 402. Once the skull 550 has achieved a sufficient strength, the burner 406 may be lowered to the depicted second position. Skull strength may be estimated by measuring a temperature of the water or coolant at the fluid outlet port 424. Since the water or coolant is being circulated within the void 408, a relatively consistent temperature can provide an estimate of temperature proximate the skull 550, and as such, whether it is safe to begin the burner removal process. Bolt set K (FIG. 5) is then disconnected. Water circulation continues as the support element 516 is lowered by the actuator 518. As the burner 406 is lowered, the gate valve 430 is closed once the tip 438 drops below the level of the valve 430. This isolates the void 408 from the burner 406. With the valve 430 closed, the interior 514 of the cooling vessel 502 is substantially isolated from an exterior of the cooling vessel 502 (were the valve 430 to be disconnected from the burner holder 426). In examples, disconnecting the valve 430 from the holder 426 may be desirable because it keeps the hot burner 406 contained until it is safe enough to handle. As the burner 406 is lowered, prior to the gate valve 430 closing, some water or coolant from the fluid inlet port 422 may leak past the valve 430 and into the cooling vessel 502, via the collar 432. As apparent from FIG. 6, the volume of the burner 406 now disposed within the cooling vessel 502 is greater than the volume of the burner 406 disposed in the cooling vessel 502 in FIG. 5. As such, cooling of the burner 406 is accelerated.

Thereafter, the cooling vessel 502 can be unfixed relative to the melt vessel 402 (e.g., by disconnecting bolt set L). A new burner can then be installed via a reverse process to that described above. For example, a new burner 406 may be placed on the support element 516 and a position of the cooling vessel 502 fixed relative to the melt vessel 402 (e.g., by securing bolt set L). As the actuator 518 raises the support element 516 and burner 406, the gate valve 430 is opened. Raising of the burner 406 continues until the tip 438 is proximate the melt vessel 402. Once in the desired position, the burner ring 418 can be secured in place (e.g., via bolt set K). With the burner ring 418 secured, bolt set L can be disconnected, thus releasing the position of the cooling vessel 502 relative to the melt vessel 402.

Figure 7:
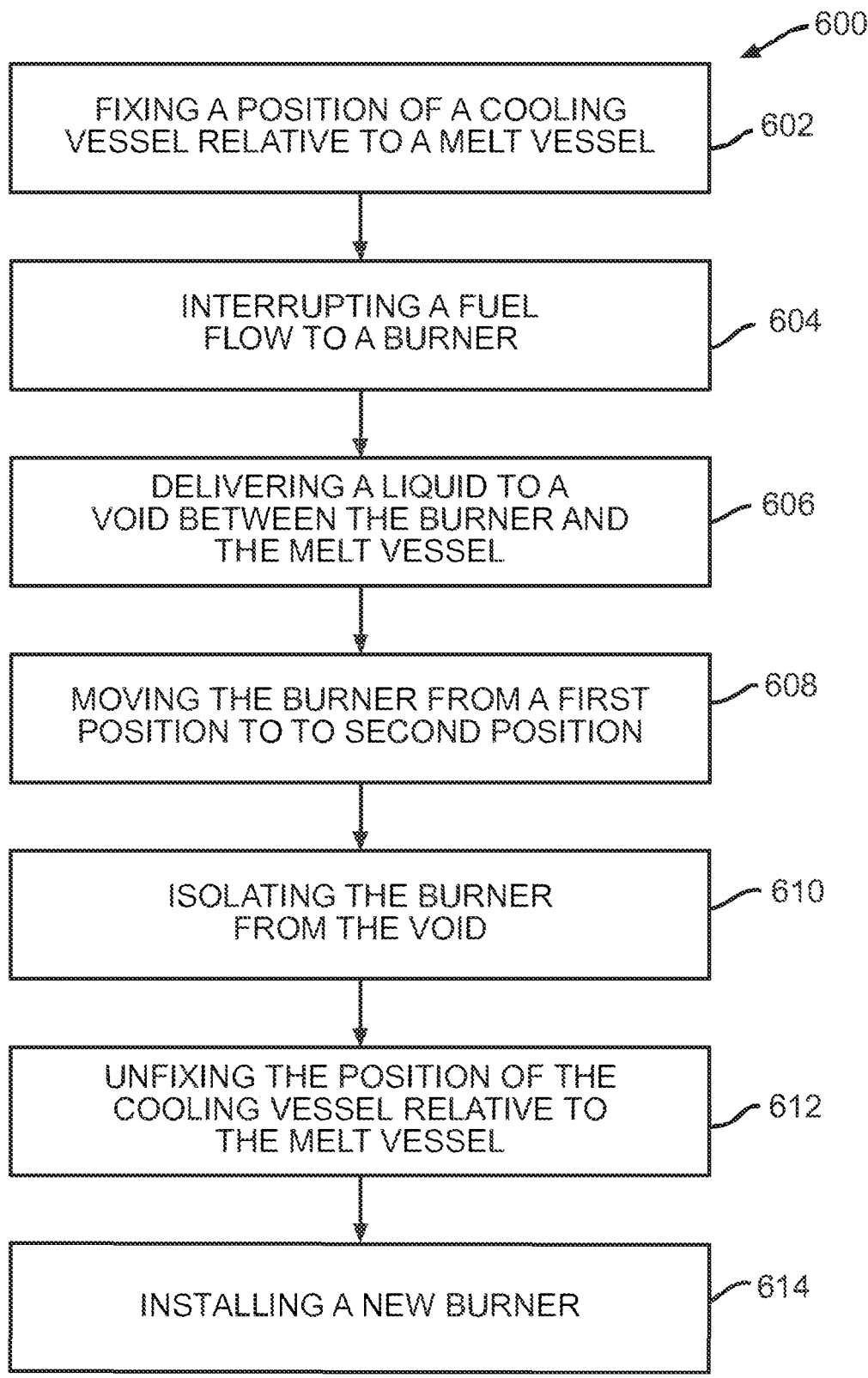
FIG. 7 depicts a method of replacing a burner in a melter system.

FIG. 7 depicts a method 600 of replacing a burner in a melter system. The method 600 begins with operation 602, which includes fixing a position of a cooling vessel relative to a melt vessel. Depending on the clearance below the melt vessel, the cooling vessel can be lifted into position via a lift system, jacks, or other implements, so as to substantially surround a burner of the melt vessel. Once in position, one or more bolt sets or fixing elements (e.g., clamps) can fix or otherwise secure the cooling vessel. In operation 604, fuel flow to the burner is interrupted or terminated. Substantially contemporaneously therewith, operation 606 begins. In operation 606, a cooling liquid is delivered to an annular void between the burner and the melt vessel. Since the void is in fluidic communication with an interior of the melt vessel, this causes the molten matrix disposed proximate the burner tip to harden or solidify into a skull over the inactive burner. In operation 608, the burner is moved from a first position (where the tip is disposed proximate the melt vessel) to a second positon (where the burner is disposed distal the melt vessel). In the position distal the melt vessel, a larger volume of the burner is disposed within the cooling vessel, so as to more effectively cool the burner. During moving operation 608, liquid delivery operation 606 continues, so as to maintain the matrix skull. Once the burner is in the second position, the burner is isolated from the void at operation 610. In examples, isolation of the burner from the void includes closing a gate valve disposed between the void and the burner. Thereafter, in operation 612, the position of the cooling vessel relative to the melt vessel is unfixed. This may include disconnecting one or more sets of bolts and lowering the cooling vessel. The burner can then be removed from the cooling vessel and a new burner disposed in the cooling vessel. Thereafter, the new burner can be installed in operation 614, which includes performing the above steps in substantially reverse order.

Figure 8:
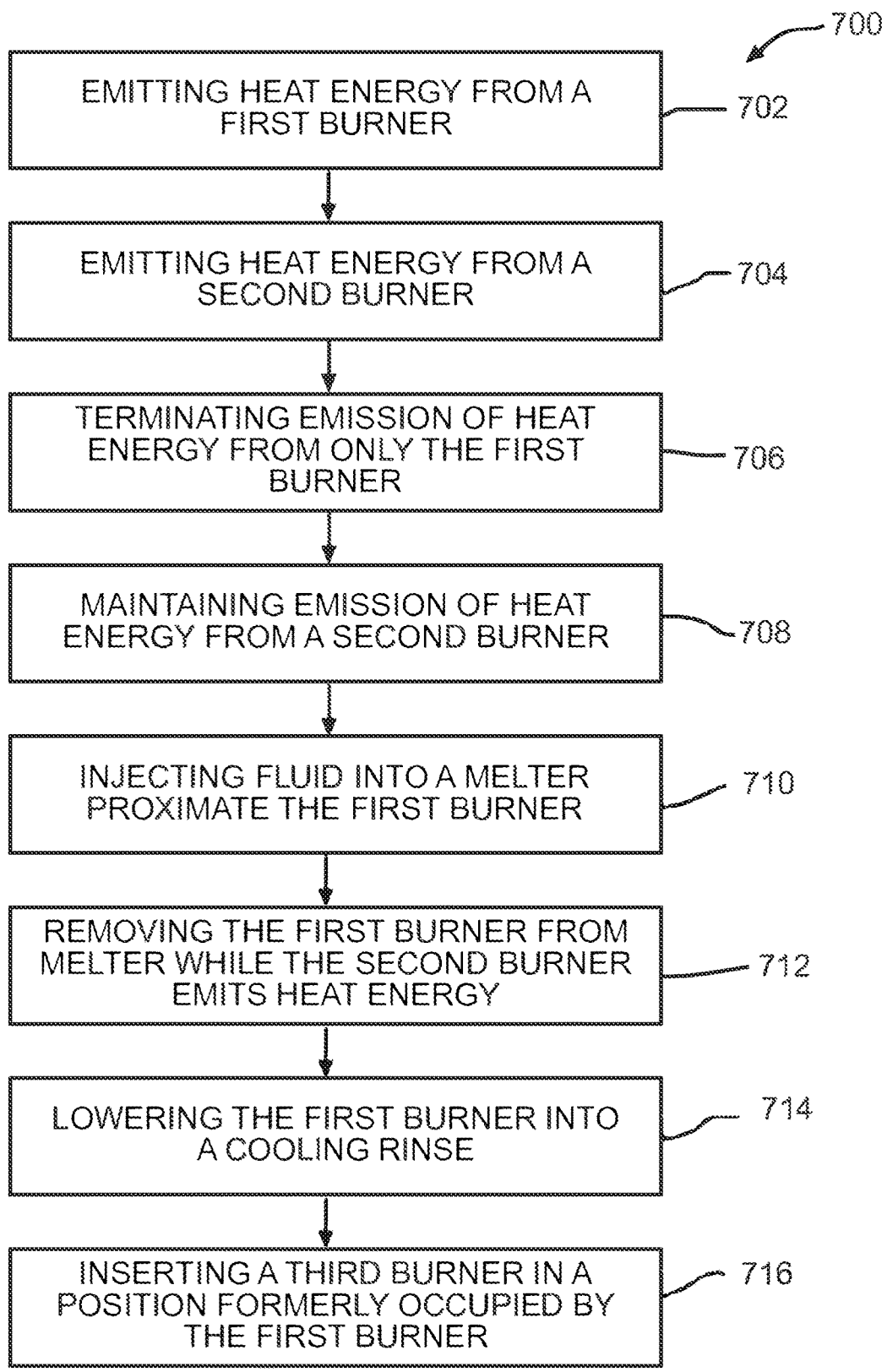
FIG. 8 depicts a method of replacing one burner in a multi-burner melter system during concurrent melt operations.

FIG. 8 depicts a method 700 of replacing one burner in a multi-burner melter system during concurrent melt operations. The method 700 begins with emitting heat energy from a first burner (operation 702) and a second burner (operation 704) so as to melt a material disposed in an SCM melter system. In operation 706, energy emission from the first burner is terminated while, in operation 708, energy emission from the second burner is maintained. In operation 710, a cooling fluid is injected into a void proximate the melt vessel and the first burner, so as to form a skull of material proximate the first burner. Once the skull is formed, the first burner is removed from the melt vessel while the second burner continues to emit heat energy, in operation 712. As the first burner is being removed, it is lowered into a cooling vessel, so as to accelerate cooling thereof, operation 714. In operation 716, a third burner can be placed in a position formerly occupied by the first burner. In this context, a third burner does not necessarily mean a new burner or a different burner, but may be the same first burner subsequent to certain maintenance, inspection, and/or repair.

Figure 9:
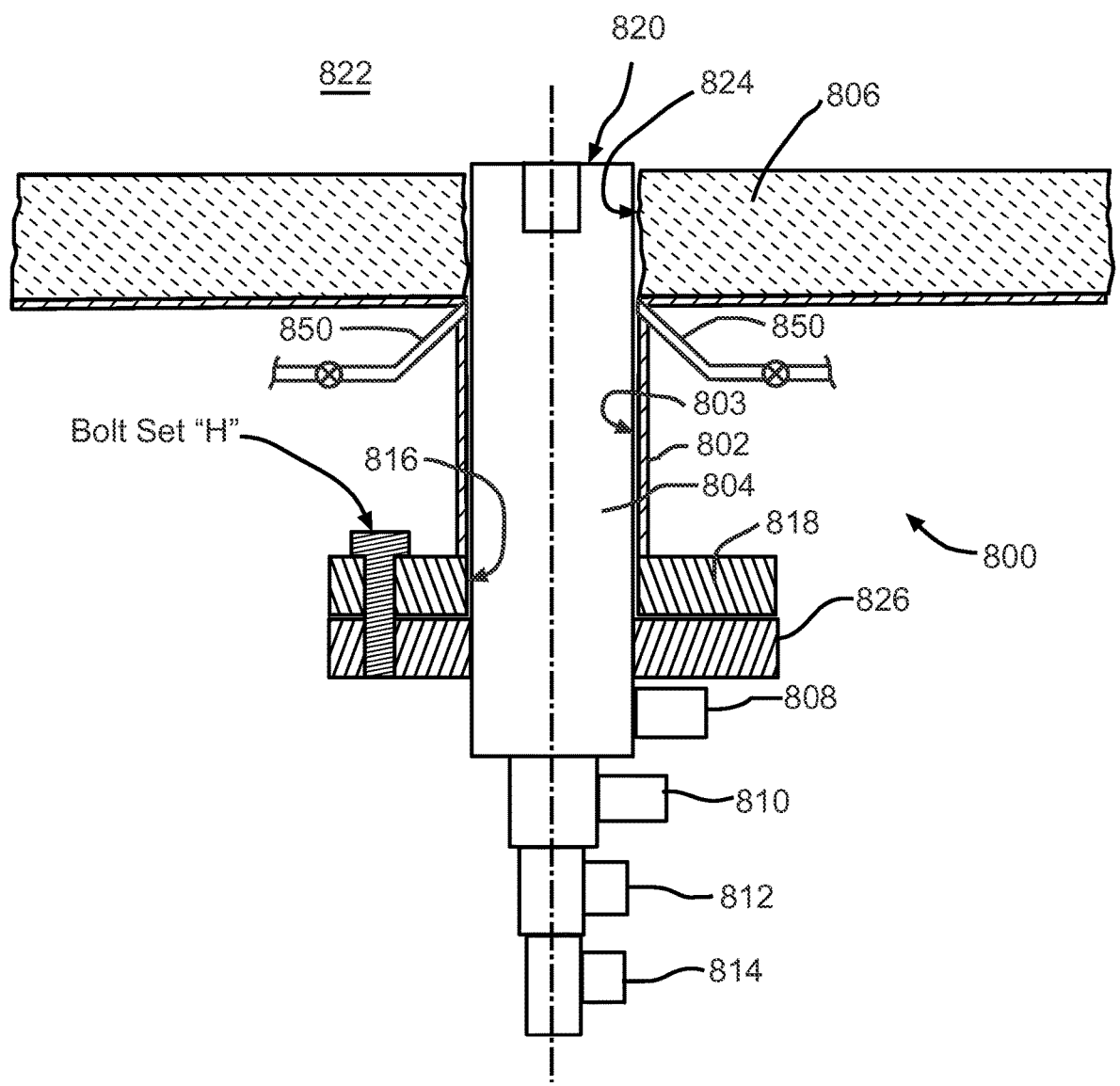
FIG. 9 depicts a partial side sectional view of a burner change-out system in accordance with another example of the present technology.

FIG. 9 depicts a partial side sectional view of a burner change-out system 800 in accordance with another example of the present technology. The burner change out system 800 utilizes a flange 802 similar to the prior art flange of FIG. 3 above. The flange, however, also includes one or more coolant connection lines 850 that are used to form a skull in a molten material. In more detail, the system 800 includes a flange 802 that supports a burner 804 in an interior void 803 thereof. The flange 802 is secured to an underside of a melt vessel or refractory 806. The burner 804 includes a number of connections, for example an oxidizer connection 808 and a fuel connection 810. Burners 804 that utilize liquid cooling also include a cooling fluid supply connection 812 and a cooling liquid return connection 814. The burner 804 penetrates a holder opening 816 in a burner holder 818 that fixes a position of the burner 804 within the flange 802, such that a burner tip 820 penetrates into or proximate an interior volume 822 of the vessel 806 at a vessel opening 824. A main flange or ring 826 secured to the burner 804 provides a point of connection with the burner holder 818. One or more bolts (typically a plurality are utilized) can be used to secure the position of the burner 804 in the flange 802. These bolts are depicted as bolt set H.

Coolant connection lines 850 are installed on the flange 802 pointing at an upward angle toward the vessel 806. In examples, four connection lines 850 can be utilized and include valves to control coolant flow during change-out procedures. To change-out the burner 804, fuel to the burner 804 may be turned off and, if desired, and air purge may be performed. Coolant is then delivered through the coolant connection lines 850 so as to form a skull above the vessel opening 824. To aid in forming the skull, adjacent burners in a multi-burner system can be turned off or the heat emission from them can be reduced. Integrity of the skull may be determined by measuring a temperature proximate the vessel opening or by viewing the interior of the flange 802 through a sight tube (not shown). Once integrity of the skull is confirmed, one or more of the various connections 810-816 can be disconnected from their supply hoses. These supply hoses can then be connected to similar connections on a new burner. Bolt set H can be disconnected, the existing burner 804 removed, and a new burner inserted into the flange 802. In a specific example, a subset of bolt set H may be disconnected before connecting making hose connections to the new burner. Once the bolt set H is reconnected for the new burner, the oxidizer gas flow can be reestablished to provide a positive pressure above the new burner and then the coolant spray can be terminated, so as to allow the skull to re-melt into the matrix. As the skull re-melts, the oxidizer gas flow will increase and the back pressure decrease. This indicates a re-melting of the skull and an opening of a flow passage for the oxidizer gas into the molten matrix. Once the skull has melted (this may be confirmed visually through the sight glass or by an indication of flow from the burner oxidizer gas up into the molten matrix from the flow sensors and pressure gages), fuel flow to the burner may be restarted. A drain tube on the side of the flange 802 is used to drain any coolant or condensed vapor that collects after creating/ maintaining the frozen skull over the burner opening. This drain tube has a valve that allows coolant from the coolant connection lines 850 to drain as needed but can be closed when not needed to prevent a passage for combustion gases during normal operation. One aspect of this drain tube is the use of multiple valves and a secondary collection container to allow drainage but maintain a sealed enclosure.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method of removing a burner having a plurality of hoses from a melt vessel, the method comprising:
   delivering a liquid into an annular void defined on an inner side by an outer wall of the burner and on an outer side by a floor of the melt vessel, wherein delivery of the liquid into the annular void forms a skull of a material disposed within an interior of the melt vessel, wherein the annular void is in fluidic communication with the interior of the melt vessel, and wherein the annular void defines an annular, volume when the burner is in a first position, wherein when in the first position, at least a portion of the burner is disposed below an outer wall of the melt vessel, and wherein the liquid is delivered to the annular void from an inlet external to the burner;
   disposing a cooling vessel around the portion of the burner disposed below the outer wall of the melt vessel, wherein the cooling vessel defines an opening that the plurality of hoses pass through;
   moving the burner from the first position to a second position external from the annular void and within the cooling vessel; and
   once the burner is in the second position, isolating the burner from the annular void.

2. The method of claim 1, further comprising fixing a position of the cooling vessel relative to the melt vessel.

3. The method of claim 2, wherein when the burner is in the second position, the burner is disposed distal from the melt vessel.

4. The method of claim 2, wherein the burner occupies a first volume of the cooling vessel when the burner is in the first position and wherein the burner occupies a second volume of the cooling vessel when the burner is in the second position, wherein the second volume is greater than the first volume.

5. The method of claim 2, further comprising unfixing the position of the cooling vessel relative to the melt vessel, once the burner is in the second position.

6. The method of claim 1, wherein isolating the burner comprises closing a valve disposed between the burner and the void when the burner is in the second position.

7. The method of claim 1, further comprising interrupting a fuel flow to the burner, prior to moving the burner to the second position.

8. The method of claim 1, wherein the melt vessel is utilized in a submerged combustion melting ("SCM") melter system.

* * * * *